United States Patent [19]

Perper

[11] 3,791,704

[45] Feb. 12, 1974

[54] TRIMMING APPARATUS FOR MAGNETIC SUSPENSION SYSTEMS

[75] Inventor: Lloyd J. Perper, Tucson, Ariz.

[73] Assignee: Cambridge Thermionic Corporation, Cambridge, Mass.

[22] Filed: Aug. 6, 1971

[21] Appl. No.: 169,665

[52] U.S. Cl. ................................................ 308/10
[51] Int. Cl. ............................................. F16c 39/06
[58] Field of Search............................. 308/10; 74/5

[56] References Cited
UNITED STATES PATENTS

| | | | |
|---|---|---|---|
| 3,490,816 | 1/1970 | Lyman | 308/10 |
| 3,243,238 | 3/1966 | Lyman | 308/10 |
| 2,436,939 | 3/1948 | Schug | 308/10 |
| 2,508,444 | 4/1970 | Sitomer | 308/10 |
| 3,124,962 | 3/1964 | Hirtreiter | 308/10 |

Primary Examiner—R. Skudy
Attorney, Agent, or Firm—Roger Norman Coe

[57] ABSTRACT

Apparatus is disclosed for trimming magnetic bearings and particularly for trimming magnetic bearings which employ two independently cooperating systems comprising a permanent magnet system and an electromagnet system. Adjustable permanent magnet means are disclosed for maintaining a suspended object in an equilibrium position which is invariant with applied force in at least one dimension. According to one embodiment the trimming is accomplished by mechanically moving adjustable permanent magnets. According to another embodiment of the invention the trimming is accomplished by varying the field of adjustable permanent magnets using at least one magnetizing winding.

7 Claims, 3 Drawing Figures

INVENTOR.
Lloyd J. Perper

ATTORNEY.

3,791,704

TRIMMING APPARATUS FOR MAGNETIC SUSPENSION SYSTEMS

BACKGROUND OF THE INVENTION

The invention described herein was made in the performance of work under a NASA contract and is subject to the provisions of Section 305 of the National Aeronautics and Space Act of 1958, Public Law 85 – 568 (72 Stat. 435;42 U.S.C. para2457).

The present invention relates to magnetic suspension systems, and more particularly, it is concerned with the utilization of adjustable permanent magnets for trimming magnetic suspension systems.

Magnetic suspension of an object without fluid flotation means has been achieved using a pair of electromagnets exerting radial centering forces and opposed axial pulling forces by variably energizing the magnets according to the relative ratio of movement and displacement of the object. An example of such a magnetic suspension system is described in Lyman patent, U. S. Letters Patent No. 3,473,852. In accordance with that system, a movable body is suspended by use of a pair of electromagnet force appliers. These force appliers are controlled by stable amplifier means which are mainly responsive to velocity of movement of the body and secondarily responsive to the displacement of the body from a predetermined position between the force appliers. In said system, each electromagnet is composed of an armature and a re-entrant cup type stator which has a coil lining inserted therein. The inner and outer pole faces of the stator and armature are substantially coplanar and are configured with confronting circular projections or ridges to produce substantial radial force components in response to, and for overcoming, slight departures from coaxial alignment between the electromagnets and their armatures.

The heretofore described magnetic suspension systems have required that the electromagnets be continually activated in order to counteract all static and dynamic loads and thereby maintain the suspended body in a desired position. In order to effect the necessary control fairly large steady state currents are required for the electromagnets. Because of the steady state current requirements, multiple problems have arisen in attempting to obtain a self-contained magnetic suspension system, including thermal problems, size and weight problems, and power supply problems.

In 1842 Earnshaw developed a theorem which states that it is impossible to obtain stable magnetic suspension through the use of static fields. This incontestable law has led investigators to conclude that power is required for suspension of a body in a magnetic field. As disclosed in application Ser. No. 160,384 now abandoned, entitled "Virtually Zero Powered Magnetic Suspension", filed July 7, 1971, Joseph Lyman has discovered that all static loads, including axial, radial and torsional of a magnetic bearing can be carried by a field supplied through permanent magnets. This is achieved, without violation of Earnshaw's theorem, through the use of auxiliary servo systems which function to provide only active control by means of independent auxiliary fields. Accordingly, when a sustained external force, such as gravity or a linear acceleration, acts on an object magnetically suspended in accordance with the invention of Lyman's application, the electromagnet system functions to maintain the suspended object in the desired position and can also function to bring about a shift in equilibrium position of the overall system.

SUMMARY OF THE INVENTION

An object of the present invention is to provide improved and more efficient magnetic suspension apparatus.

Another object of the present invention is to provide an improved system for suspending a movable body wherein two independently cooperating systems comprising a permanent magnet system and electromagnet system are employed.

A further object of the present invention is to provide a system of virtually zero powered magnetic suspension with a zero centering error.

Still another object of the present invention is to provide a magnetic suspension system having an equilibrium position which will be invariant with applied force in at least one dimension.

In accordance with the present invention, adjustable permanent magnet means are employed for trimming magnetic suspension systems thereby enabling a suspended body to be maintained in an equilibrium position which is invariant with applied force in at least one dimension. According to one embodiment the trimming is accomplished by mechanically moving adjustable permanent magnets. According to another embodiment of the invention the trimming is accomplished by varying the field of the adjustable permanent magnets using a magnetizing winding.

BRIEF DESCRIPTION OF THE DRAWINGS

Other and further objects, advantages and features of the invention will be apparent to those skilled in the art from the following detailed description thereof, taken in conjunction with the accompanying drawngs, in which.

DESCRIPTION OF THE PREFERRED EMBODIMENTS

Figure 1:
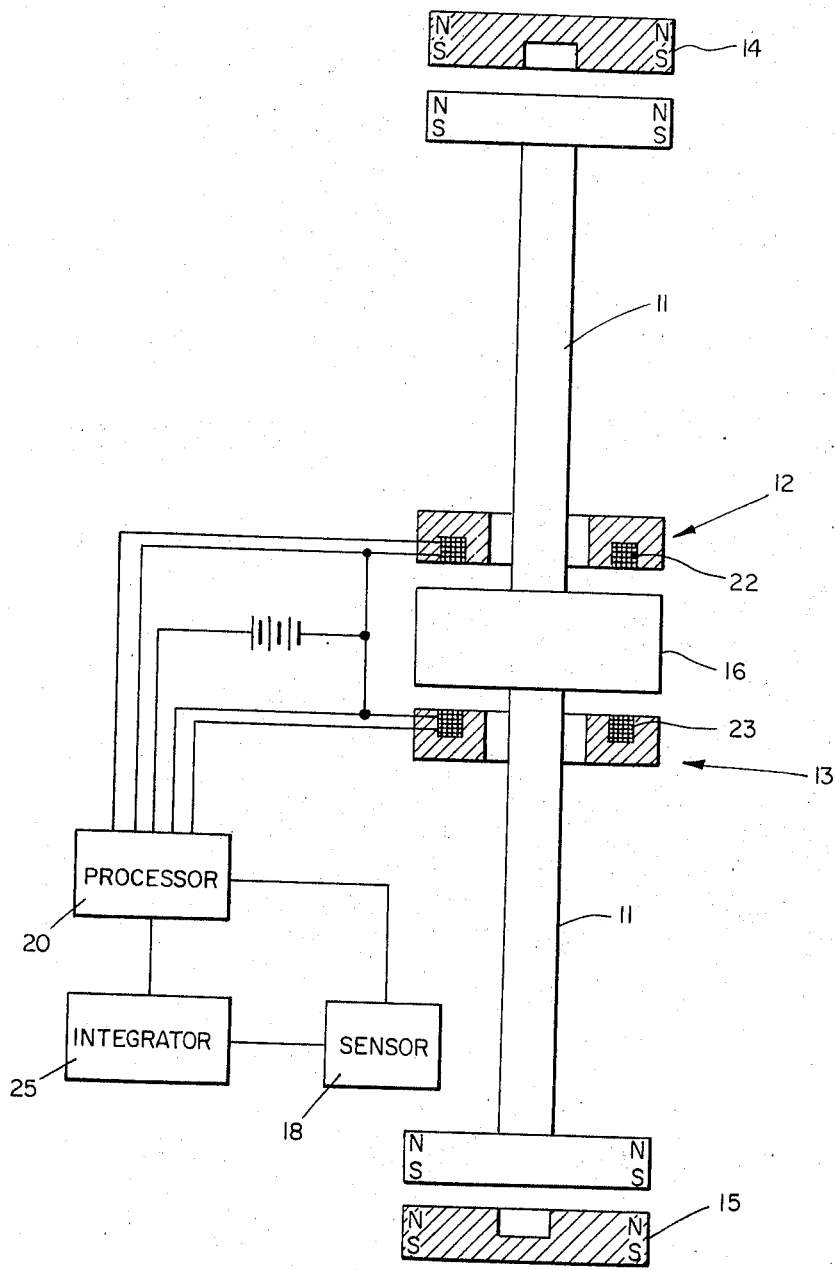
FIG. 1 illustrates in a highly schematic form a prior art embodiment, with portions being shown in cross section.

FIG 1 illustrates the invention set forth in Lyman application Ser. No. 160,384, entitled "Virtually Zero Powered Magnetic Suspension", filed July seven, 1971. In this drawing a rigid body 11, such as a cylinder, is suspended between electromagnets 12 and 13 and permanent magnets 14 and 15. Permanent magnet assemblies 14 and 15 provide radial restoring forces, but contribute to axial instability such that rigid body 11 is sensed by sensor 18, which may be a displacement and- /or a rate sensor. As described in more detail in U.S. Letters Patent No. 3,473,852, which is hereby incorporated by reference, sensor 18 can include any suitable means for sensing movement of the suspended body 11, such as means for obtaining a rate component by means of one or more coils arranged to cooperate with a permanent magnet at the end of suspended body 11. Movement of the suspended body causes either an increase or a decrease in the magnetic flux linkage with the turns of the coil thereby resulting in an output voltage of a polarity proportional to the rate of movement of the suspended body. A displacement component can be derived from a photoelectric arrangement having a light source, a shield and a photoelectric cell for sensing the displacement of suspended body 11. The output from sensor 18 is amplified and filtered in processor 20 and used to actuate force coils 22 and 23 in electromagnets 12 and 13, respectively. These electromagnets act to dynamically center suspended rigid body 11. By integrating the output from sensor 18 in integrator 25, the steady state driving power applied to coils 22 and 23 of electromagnets 12 and 13 may be gradually reduced. This is effected by displacing the equilibrium point toward the source of external force. The resultant axial force of the permanent magnets then balances the applied external force.

Considering FIG. 1 in more detail, suspended body 11 is illustrated as the figure of revolution about its longitudinal axis, for example, a cylinder. It may take the form of a gyroscope rotor, or may be vertically arranged as a rotary mass from which a centrifugal chamber is to depend. As with other magnetic suspension apparatus, brushes and mechanical bearings of conventional d-c motors, with their attendant problems, are eliminated. For imparting high speed rotation to the suspended body 11, a rotating induction field may be produced by motor 16 which surrounds the suspended body. As mentioned above, the contribution of permanent magnets 14 and 15 is unstable. As suspended body 11 moves toward permanent magnet 15, for example, the force or attraction of the permanent magnet increases and the force or attraction of the opposing permanent magnet 14 decreases. Without the electromagnet servo system, suspended body 11 would be a falling body, supported radially by the fields of the permanent magnets. Stability, as distinguished from the normal sustaining force, is provided by the electromagnets 12 and 13.

Each of the electromagnets 12 and 13 comprises two cylindrical permeable members so constructed and arranged as to exert on suspended body 11 a force parallel to the axis thereof when said body is aligned with the axis of the electromagnets, and to exert a force component transverse to the axis of suspended body 11 when it is slightly displaced from a position of coincidence with its axis and with the axis of the electromagnets. These electromagnets are energized by direct current, the intensity of energization being differentially controlled.

The outer cylindrical member of electromagnet 12 is composed of permeable material. The electromagnetic coil illustrated in the drawing is a stationary coil winding 22. This electromagnetic coil takes the form of a thin cylindrical shell in which overlapped windings are present in a suitable plastic matrix, such as epoxy. Electromagnet 13 is similarly constructed with a cylindrical permeable member and a stationary coil winding 23.

The electromagnets are used as part of the servo system to maintain suspended body 11 in a zero center position, which is a position lying on a plane cutting through the magnetic center of the field supplied by the permanent magnets. At or in the region immediately adjacent to the aforementioned plane extremely small forces are required to maintain the magnetic "center of gravity" of the suspended body. The servo system senses may axial transitional velocity and acts to reduce this velocity and restore suspended body 11 to its original position.

Since the electromagnets can be regulated, the whole acceleration field can be shifted axially. One manner of accomplishing this is by biasing an amplifier. Thus, if movable body 11 moves toward the lower permanent magnet 15, and the pole of that magnet is increased, the differential upward pull of the upper electromagnet 12 is adjusted to increase much more steeply to restore stability of the overall system. Accordingly, the electromagnets can be so regulated to reduce the velocity of movable body 11, stop it altogether and even reverse the velocity of said body until it is once again coincident with the neutral or zero acceleration position. At the neutral or zero acceleration position, the electromagnets are needed only to maintain the position since the permanent magnets carry all static loads. Virtually zero power is required to maintain the movable body in the zero or neutral acceleration position once the movable body has been properly positioned.

Without adjusting the accerlation field, differential upward pull (net) of the electromagnets minus the differential downward pull (net) of the permanent magnets would be necessary to equal a steady state force downward (e.g., gravity). By adjusting the entire acceleration field, the electromagnets are relieved of the burden of producing a substantial steady state net force.

It will be seen that in FIG. 1, the equilibrium position of rigid body 11 which is suspended magnetically is inherently off center in the presence of axial acceleration. This reduces the dynamic range of motion in the direction of the displacement of rigid body 11 and causes unequal radial stiffness to be present at permanent magnet assemblies 14 and 15. These problems are overcome in accordance with the present invention.

Figures 2, 3:
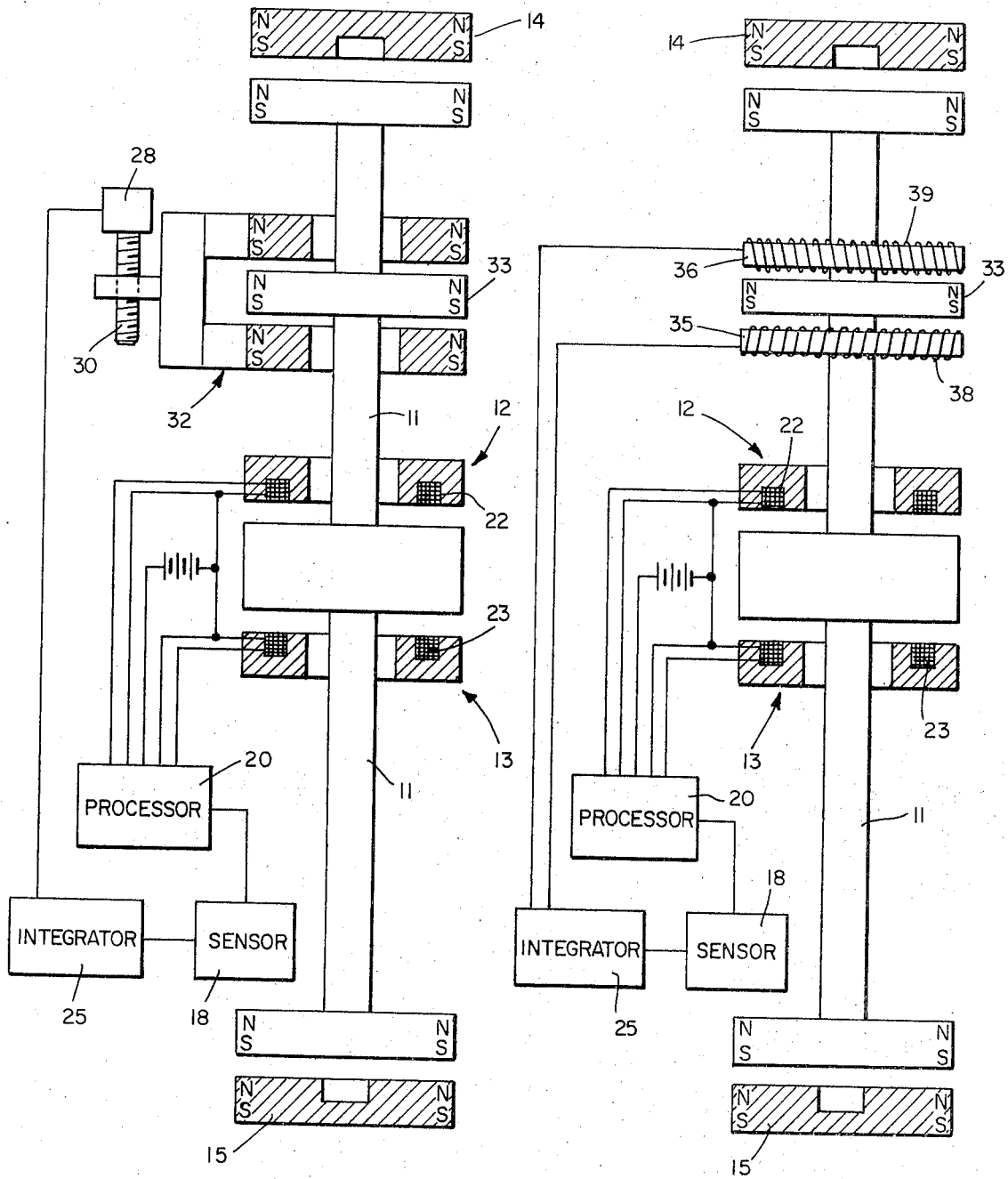
FIG. 2 is a highly schematic drawing which illustrates an embodiment in accordance with the present invention employing a mechanically operated lead screw to regulate the position of permanent magnets, ith portions of the drawing being shown in cross section.
FIG. 3 is a highly schematic drawing of another embodiment of the invention which illustrates the solid state implementation of the invention for the avoidance of all mechanical friction in a magnetic suspension system, with portions of the drawing being shown in cross section.

In FIG. 2, components which are identical to that shown in FIG. 1 have been numbered identically. In contrast to FIG. 1, integrator 25, instead of adding to the force coil currents, controls motor 28 which drives the lead screw 30, thereby positioning permanent magnet assembly 32, relative to disc 33 on the shaft of rigid body 11.

It will be seen that in accordance with the present invention an equilibrium position can be obtained which is invariant with applied force in at least one dimension. Motor 28 drives the permanent magnet assembly 32 to null the output of processor 20 and thereby obtain a condition such that the magnetic force produced by permanent magnet assembly 32 exactly balances out any applied external force without displacement of rigid body 11 which is suspended.

FIG. 3 illustrates an alternative embodiment to that shown in FIG. 2. In accordance with the embodiment shown in FIG. 3, the permanent magnet system comprising permanent magnets 35 and 36 are fixed physically, but are magnetically adjustable. By applying short, high energy pulses to magnetizing coils 38 and 39 of magnetic material 35 and 36, respectively, the field of such magnetic material is adjustable incrementally. For example incremental changes can be obtained by an analog method wherein the intensity of a magnetizing pulse transmitted to a magnetizing coil is controlled to produce a specified change in the operating B-H characteristic of the magnetic material. According to another method, the digital method, the magnetic material is separated into sections which are then driven to saturation in one direction or the other according to a digital switching command system (not shown) generated by an analog-to-digital conversion of the integrated error signal from integrator 25. The choice of materials employed is obviously important. Ferromagnetic materials are suitable since these materials can be magnetized readily. Such materials include not only iron, nickel and cobalt but also alloys containing components which are not ferromagnetic.

The embodiment of FIG. 3 overcomes certain difficulties with the mechanical adjustment of the permanent magnet assembly 32 illustrated in FIG. 2. For example, in certain applications, such as utilization in space, a problem occurs with mechanical bearings since the lubricant necessary for such bearings tend to evaporate. The solid state embodiment of FIG. 3 contains no moving parts in the control system.

From the foregoing, it will be seen that this invention is well adapted to obtain all the ends and objects hereinabove set forth, together with other advantages which are obvious and which are inherent to the system. Although the present invention has been described in terms of maintaining an equilibrium position in a magnetic suspension system employing both permanent magnets and electromagnets, it will be understood that the present invention can be used in connection with other types of magnetic suspension systems, including magnetic suspension systems employing only electromagnets, such as that illustrated by Lyman U.S. Pat. No. 3,473,852.

Regardless of the magnetic suspension system employed, the present invention can be used advantageously not only to maintain a suspended object in a desired position but can also be used advantageously for initial axial centering of the suspended body. Under ordinary conditions, the force coils of the electromagnets should be capable of centering a magnetically suspended object during any start-up operation. By utilizing the present invention, start-up operations involving magnetic suspension systems are not as critically dependent upon the electromagnets. For example, the mechanical advantage of lead screw 30 (FIG. 2) can be employed for an initial centering operation to maintain the suspended body 11 in a desired position until other servo systems are engaged. In this manner, initial centering of suspended body can be obtained with reduced power supply energy storage requirements.

If desired, the system shown in the drawings may be horizontally disposed. If it is operated in the earth's gravitational field, the permanent magnets 14 and 15 are then required to exhibit vertical force components. Actually, the improved apparatus of the present invention permits the apparatus to be used in a variety of different environments, with various amount of force due to gravity and/or vehicle acceleration. The magnetic suspension system will accommodate relative displacements between the suspending portion and the suspending apparatus, including angular as well as translation components.

It will be understood that the permanent magnets can be made from any suitable material. However, samarium cobalt is a particularly suitable material where it is desirable to conserve space and minimize weight.

The present invention permits a physical object to be suspended in the presence of varying disturbing forces solely through the inherent fields existing in permanent magnets with the expenditure of extremely small and almost nominal, amounts of power needed for control purposes and without necessitating adjustment of the acceleration field involved. All static loads are carried by the permanent magnet fields which restrain the suspended object in five of the six degrees of freedom. For utility, only rotation about one axis is unrestricted.

The present invention, which provides an equilibrium position which will be invariant with applied force in at least one dimension, is of importance in instruments such as gyroscopic devices, and is desirable in general to avoid reduction of dynamic range of control in the direction of displacement. Using the present invention, the magnetic suspension system can be trimmed at equilibrium position so that minimum power is absorbed by the force coils and other actuating means. Functional alternatives are present which include solid state as well as mechanical implementation of the invention, thereby permitting the total avoidance of mechanical friction in a magnetic suspension system.

Obviously, many other modifications and variations of the invention as hereinbefore set forth may be made without departing from the spirit and scope thereof.

What is claimed is:

1. Trimming apparatus for magnetic suspension systems, comprising:
   a movable object;
   mutually opposed first and second permanent magnet means for suspending said movable object;
   separate trimming permanent magnet means for suspending said movable object;
   means for adjusting the field of said trimming permanent magnet means to an equilibrium position invariant with applied force in at least one dimension;
   first and second electromagnet force applying means for exerting electrically controllable additional forces on said movable object, said first and second electromagnet force applying means positioned to cause said movable object to return to its neutral force position when electrically controllable additional forces are exerted on said movable object; and
   means for differentially energizing said first and second electromagnet means to cause electrically controllable additional forces to act on said movable object.

2. Trimming apparatus as defined in claim 1 which also includes means primarily responsive to the component of velocity of said movable object in a direction parallel to its longitudinal axis for supplying an input control signal to the means used for adjusting the field of said trimming permanent magnet means.

3. Trimming apparatus as defined in claim 1 which further includes means primarily responsive to the displacement of said movable object from a predetermined position along its longitudinal axis for supplying an input control signal to the means used for adjusting the field of said trimming permanent magnet means.

4. Trimming apparatus as defined in claim 1 wherein the means for adjusting the field of a trimming permanent magnet means to an equilibrium position invariant with applied force in at least one dimension comprises a magnetizing winding around said trimming permanent magnet means for establishing the magnetic field of said trimming permanent magnet means and means for energizing said magnetizing winding.

5. Trimming apparatus as defined in claim 4 wherein the means for energizing the magnetizing winding is accomplished by short electrical pulses.

6. Trimming apparatus as defined in claim 4 wherein the trimming permanent magnet means consists of magnetic material separated into sections and the magnetizing winding applied to said trimming permanent magnet means permits magnetization of the sections of the magnetic material to be varied.

7. Trimming apparatus for magnetic suspension systems, comprising:

a movable object;

separate first and second permanent magnet means for suspending said movable object;

means for physically moving the second permanent magnet means whereby the field of the second permanent magnet means is adjusted thereby enabling the movable object to be maintained in an equilibrium position which is invariant with applied force in at least one dimension;

electromagnet means for exerting electrically controllable forces on said movable object; and means for energizing said electromagnet means to achieve stability of positioning of the suspended movable object.

* * * * *